United States Patent
Thangarasa et al.

(10) Patent No.: US 11,533,142 B2
(45) Date of Patent: Dec. 20, 2022

(54) OBTAINING LEAN CARRIER ASSISTANCE INFORMATION

(71) Applicant: Telefonaktiebolaget LM Ericsson (publ), Stockholm (SE)

(72) Inventors: Santhan Thangarasa, Vällingby (SE); Muhammad Kazmi, Sundbyberg (SE); Torgny Palenius, Barsebäck (SE); Iana Siomina, Täby (SE); Kazuyoshi Uesaka, Kawasaki Kanagawa (JP)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 97 days.

(21) Appl. No.: 16/763,664

(22) PCT Filed: Nov. 15, 2018

(86) PCT No.: PCT/SE2018/051178
§ 371 (c)(1),
(2) Date: May 13, 2020

(87) PCT Pub. No.: WO2019/098926
PCT Pub. Date: May 23, 2019

(65) Prior Publication Data
US 2021/0367725 A1    Nov. 25, 2021

Related U.S. Application Data

(60) Provisional application No. 62/587,746, filed on Nov. 17, 2017.

(51) Int. Cl.
*H04L 5/00* (2006.01)
*H04W 48/16* (2009.01)
*H04W 72/04* (2009.01)

(52) U.S. Cl.
CPC .......... *H04L 5/0048* (2013.01); *H04W 48/16* (2013.01); *H04W 72/0453* (2013.01)

(58) Field of Classification Search
CPC .. H04L 5/0048; H04W 48/16; H04W 72/0453
See application file for complete search history.

(56) References Cited

U.S. PATENT DOCUMENTS

2011/0105144 A1   5/2011   Siomina et al.
2011/0261673 A1   10/2011  Luo et al.
(Continued)

FOREIGN PATENT DOCUMENTS

CN    103563450 A    2/2014
EP    2 556 619 B1   7/2018
(Continued)

OTHER PUBLICATIONS

3GPP TSG-RAN WG4 Meeting #84; Berlin, Germany; Source: MediaTek Inc.; Title: Legacy Impacts on Demodulation (R4-1707868)—Aug. 21-25, 2017.
(Continued)

*Primary Examiner* — Ronald B Abelson
(74) *Attorney, Agent, or Firm* — Baker Botts, LLP

(57) ABSTRACT

According to some embodiments, a method performed by a wireless device for lean carrier operation comprises obtaining lean carrier assistance information (LCAI). The LCAI comprises one or more of the following sets of information for a carrier frequency: reference signal (RS) muting pattern information, wherein the RS muting pattern information provides a RS muting pattern used in one or more cells on the carrier frequency; and coverage area information, wherein the coverage area information indicates a coverage area where the RS muting is applied or is expected to be applied on one or more cells operating on the carrier (Continued)

frequency. The method further comprises performing one or more radio operational tasks using the LCAI.

26 Claims, 16 Drawing Sheets

(56) References Cited

U.S. PATENT DOCUMENTS

| | | | |
|---|---|---|---|
| 2012/0046030 A1 | 2/2012 | Siomina et al. | |
| 2012/0076106 A1* | 3/2012 | Bhattad | H04L 5/0064 |
| 2013/0223264 A1* | 8/2013 | Miki | H04J 11/005 |
| 2016/0043846 A1 | 2/2016 | Siomina et al. | |
| 2016/0262111 A1* | 9/2016 | Boudreau | H04W 52/383 |
| 2019/0124612 A1 | 4/2019 | Ruffini et al. | |
| 2020/0204318 A1* | 6/2020 | Thangarasa | H04L 5/0048 |

FOREIGN PATENT DOCUMENTS

| | | |
|---|---|---|
| WO | 2009 068620 A1 | 6/2009 |
| WO | 2010 031725 A1 | 3/2010 |
| WO | 2017 171621 A1 | 10/2017 |
| WO | 2017 171623 A2 | 10/2017 |
| WO | 2019 032038 A1 | 2/2019 |

OTHER PUBLICATIONS

3GPP TSG-RAN WG4 Meeting #84; Berlin, Germany; Source: MediaTek Inc.; Title: Legacy impacts on RLM and RACH Procedures (R4-1707869)—Aug. 21-25, 2017.
3GPP TSG RAN Meeting #76; West Palm Beach, USA; Source: Ericsson; Title: New LTE WI on UE requirements for network-based CRS mitigation (RP-171408)—Jun. 5-8, 2017.
PCT International Search Report for International application No. PCT/SE2018/051178—dated Mar. 20, 2019.
PCT Written Opinion of the International Searching Authority for International application No. PCT/SE2018/051178—dated Mar. 20, 2019.
European Search Report issued for Application No. / Patent No. 18878592.7-1205 / 3711177 PCT/SE2018051178—dated Jun. 22, 2021.
Chinese Office Action issued for Application No. 201880074441.2—dated Apr. 6, 2022.
3GPP TSG-RAN WG1 #59bis; Valencia, Spain; Source: Ericsson, ST-Ericsson; Title: On CSI RS Design (R1-100048)—Jan. 18-22, 2010.
3GPP TSG-RAN WG1#74; Barcelona, Spain; Source: Samsung; Title: Discussion on small cell discovery (R1-133774)—Aug. 19-23, 2013.
Summary of First Office Action issued for Application No. 201880074441.2—dated Apr. 6, 2022.

* cited by examiner

OBTAINING LEAN CARRIER ASSISTANCE INFORMATION

PRIORITY

This nonprovisional application is a U.S. National Stage Filing under 35 U.S.C. § 371 of International Patent Application Serial No. PCT/SE2018/051178 filed Nov. 15, 2018 and entitled "Obtaining Lean Carrier Assistance Information" which claims priority to U.S. Provisional Patent Application No. 62/587,746 filed Nov. 17, 2017 both of which are hereby incorporated by reference in their entirety.

TECHNICAL FIELD

Embodiments of the present disclosure are directed to wireless communications and, more particularly, to obtaining lean carrier assistance information.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description. Embodiments of the present disclosure include systems and methods for improving the frequency search, which is part of the overall cell search procedure. Some concepts that influence frequency search performance include channel raster and channel numbering.

The cell search procedure operates as follows. When a user equipment (UE) is powered on, it first searches a list of all possible frequencies (or channels) in a frequency band. The goal is to find, in a particular band, the most suitable frequency channels in use in a region. In the first step, for every possible carrier frequency within a band, the UE typically estimates or detects the energy received over the carrier frequency within the UE bandwidth or within the system bandwidth, depending on the frequency band. This may be referred to as initial cell search, band scanning, frequency scanning, among other names. If the detected energy level indicates that there is a downlink transmission, then the UE proceeds with the next step of cell search described below.

The complexity of the frequency search increases proportionally with the increase in the number of bands to scan and also the number of carriers within each band. In this phase or step, the UE proceeds with remaining tasks or, more specifically, acquires the cell timing and cell ID of neighbor cells that are operated on the same frequency channel found in the first step. During the frequency searching, the UE generally also detects the timing of the strongest cell. This may depend, however, upon the specific algorithm used for frequency search. For example, the UE typically performs correlation over the synchronization sequences while assuming a certain center frequency.

After acquiring frequency synchronization, the UE continues performing the neighbor cell search. It therefore continuously attempts to find the cell timing and physical ID of the cells operating on the acquired carrier frequency.

Some cells may perform reference signal muting. In long term evolution (LTE), for example, a base station transmits cell-specific reference signals (CRSs) using full system bandwidth and in all downlink subframes in a radio frame. A UE uses the CRS for several procedures. Examples of such procedures are time and/or frequency tracking or synchronization, channel estimation, radio link quality measurements, cell selection, cell reselection, among others.

A UE, however, does not use CRSs all the time. The continuous CRS transmission with full system bandwidth in one cell may cause interference at a UE operating in a neighboring cell. The CRS transmission also consumes base station power. Accordingly, in certain scenarios, the CRS may be muted in a cell during inactive time (e.g., OFF duration) of the discontinuous reception (DRX) while CRS are transmitted over full bandwidth during active time (e.g., ON duration) of the DRX cycle.

FIG. 1 illustrates one example of CRS muting operation. The horizontal axis represents the time-domain for five example radio frames numbered 0-4. A "muted CRS" refers to transmission of CRS using reduced CRS bandwidth (e.g., over central 6 RBs within cell BW) during inactive time of the DRX excluding warm up and cool down periods. The warm up and cool down periods typically occur during the inactive time and during which CRS is transmitted over the full bandwidth of the cell or over a larger bandwidth. As a special case, warmup and/or cool down periods can be zero. During at least the active time of the DRX, the CRS are transmitted over full bandwidth or larger bandwidth. This may also be referred to as lean carrier operation, RS muting, or CRS muting. Lean carrier operation is applied when DRX and/or eDRX cycle is used.

In LTE, DRX cycle is used to facilitate UE battery conservation. The DRX cycle is used in RRC idle state and may also be used in RRC connected state. Examples of DRX cycle lengths currently used in RRC idle state include 320 ms, 640 ms, 1.28 s and 2.56 s. Example DRX cycle lengths currently used in RRC connected state may range from 2 ms to 2.56 s. The enhanced DRX (eDRX) cycles may be very long, for example, ranging from several seconds to several minutes and even up to one or more hours. Typical values of eDRX cycles may be between 4-10 minutes. The DRX cycle is configured by the network node and is characterized by the following parameters:

On Duration: During the on duration of the DRX cycle, a timer called 'onDurationTimer', which is configured by the network node, is running. The timer specifies the number of consecutive control channel subframes (e.g., physical downlink control channel (PDCCH), ePDCCH subframe(s)) at the beginning of a DRX Cycle. It is also interchangeably referred to as a DRX ON period. More specifically, it is the duration in downlink subframes that the UE after waking up from DRX to receive control channel (e.g., PDCCH, ePDCCH). When the onDurationTimer is running, the UE is considered to be in DRX state of the DRX cycle.

DRX-Inactivity Timer: If the UE successfully decodes the control channel (e.g., PDCCH, ePDCCH, MPDCCH, NPDCCH, etc,) during the ON duration, then the UE starts a DRX-inactivity timer (described below) and stays awake until its expiry. It specifies the number of consecutive control channel (e.g., PDCCH, ePDCCH) subframe(s) after the subframe in which a control channel (e.g., PDCCH) indicates an initial uplink or downlink user data transmission for this media access control (MAC) entity. It is also configured by the network node. When the DRX-inactivity timer is running, the UE is considered to be in non-DRX state—no DRX is used.

DRX Active Time: This time is the duration during which the UE monitors the control channel (e.g., PDCCH, ePDCCH, MPDCCH, NPDCCH, etc.). In other words, this is the total duration during which the UE receiver is active or awake. This includes the "on-duration" of the DRX cycle, the time during which the UE is performing continuous reception while the inactivity timer has not expired and the time the UE is performing continuous reception while waiting for a downlink retransmission after one hybrid automatic repeat request (HARQ) round trip time (RTT). In contrast, during DRX inactive time the UE receiver is not active or awake, and therefore the UE is not expected to monitor any control channel. The DRX operation with more detailed parameters in LTE is illustrated in FIG. 2.

FIG. 2 is a timing diagram illustrating DRX cycle operation in LTE. The examples also apply when the UE is configured with eDRX. The eDRX cycle with DRX cycle length larger than certain threshold (e.g., 5.12 seconds) and contains a paging transmission window (PTW) within each eDRX cycle. The PTW contains 1 or more DRX cycles.

SUMMARY

Based on the description above, certain challenges currently exist with lean carrier operation. For example, during initial access, a user equipment (UE) has no prior information about the presence of the cell that it is trying to access and is not aware of the center-frequency of the synchronization signals (e.g., primary synchronization signal (PSS)/secondary synchronization signal (SSS)) used for cell identification. In some deployment scenarios (e.g., long term evolution (LTE)) the center frequencies of the cell and of the synchronization signals are the same. In other deployment scenarios (e.g., new radio (NR)), the center frequencies of the cell and of the synchronization signals (synchronization signal block (SSB)) may or may not be the same.

A first step for identifying the cell during initial access is to determine the presence of a carrier frequency over which the cell operates. This may be referred to as frequency scanning, band scanning, frequency search, or initial cell search. A next step is to identify the cell operating on the determined carrier frequency. This also includes the determination of the center of the synchronization signals. In the band scanning procedure, the UE typically estimates the energy (Pe) over a carrier frequency (F1) and compares it with a certain energy threshold (Hg) to determine whether one or more cells may operate on the carrier frequency, F1.

The first step (e.g., band scanning procedure) works fine in legacy systems where the reference signals (e.g., cell specific reference signals (CRS)) are always transmitted over the full cell bandwidth. A problem arises, however, in LTE releases (e.g., Rel-15) where cells employ lean carrier operation. In lean carrier operation, the reference signals can be muted or transmitted only within a certain part of the cell bandwidth. Furthermore, the UE radio frequency bandwidth can be smaller than the cell bandwidth. This makes the legacy method for frequency scanning for initial access unsuitable under these conditions.

When a UE, which has been operating under a cell where RS has been transmitted over full cell bandwidth, moves into a new area where using lean carrier operation, the UE will have a problem accessing the cell. Similarly, when a UE, which has been operating under a cell using lean carrier operation, moves into a new area where lean carrier is not used and a reference signal is transmitted over full bandwidth, the UE may consume significant (unnecessary) power to do the initial access. Furthermore, insufficient information about the reference signal muting used in a cell also degrades the UE performance related to procedures which require a reference signal, for example, CRS.

Particular embodiments may provide solutions to these or other challenges. For example, in some embodiments a network node and/or a user wireless device may use lean carrier assistance information (LCAI) to improve operational efficiency.

According to some embodiments, a method performed by a wireless device for lean carrier operation comprises obtaining LCAI. The LCAI comprises one or more of the following sets of information for a carrier frequency: reference signal (RS) muting pattern information, wherein the RS muting pattern information provides a RS muting pattern used in one or more cells on the carrier frequency; and coverage area information, wherein the coverage area information indicates a coverage area where the RS muting is applied or is expected to be applied on one or more cells operating on the carrier frequency. The method further comprises performing one or more radio operational tasks using the LCAI.

In particular embodiments, the LCAI further comprises timing information. The timing information indicates a time during which the RS muting is applied or is expected to be applied on one or more cells operating on the carrier frequency. The LCAI may further comprise carrier frequency information. The carrier frequency information indicates one or more cells in which the RS muting pattern is applied or expected to be applied. The carrier frequency information may be an absolute radio frequency channel number (ARFCN) of the carrier frequency.

In particular embodiments, obtaining the LCAI comprises one or more of the following: receiving the LCAI from a network node; obtaining pre-provisioned LCAI from memory; determining the LCAI using historical data; and receiving the LCAI from another wireless device. The LCAI may be received from the network node via a master information block (MIB) or a system information block (SIB).

In particular embodiments, the one or more radio operational tasks comprises one or more of: performing an initial cell search; performing a neighbor cell search; performing time or frequency synchronization; performing channel estimation; optimizing power saving; adapting the wireless device activity to the RS muting pattern; storing the LCAI in a memory; transmitting at least a portion of the LCAI to another wireless device; and transmitting at least a portion of the LCAI to a network node.

In particular embodiments, the coverage area information comprises one or more of a coverage area of one or more cells operating on the carrier frequency, a tracking area, a sector identifier, and a location information. The RS muting pattern information may comprise at least one of an indication of a muted bandwidth and an indication of a muted time duration.

According to some embodiments, a wireless device is operable to perform lean carrier operation. The wireless device comprises processing circuitry operable to LCAI. The LCAI comprises one or more of the following sets of information for a carrier frequency: RS muting pattern information, wherein the RS muting pattern information provides a RS muting pattern used in one or more cells on the carrier frequency; and coverage area information, wherein the coverage area information indicates a coverage area where the RS muting is applied or is expected to be applied on one or more cells operating on the carrier frequency. The processing circuitry is further operable to perform one or more radio operational tasks using the LCAI.

In particular embodiments, the LCAI further comprises timing information. The timing information indicates a time during which the RS muting is applied or is expected to be applied on one or more cells operating on the carrier frequency. The LCAI may further comprise carrier frequency information. The carrier frequency information indicates one or more cells in which the RS muting pattern is applied or expected to be applied. The carrier frequency information may be an ARFCN of the carrier frequency.

In particular embodiments, the processing circuitry is operable to obtain the LCAI by one or more of the following: receiving the LCAI from a network node; obtaining pre-provisioned LCAI from memory; determining the LCAI using historical data; and receiving the LCAI from another wireless device. The LCAI may be received from the network node via a MIB or a SIB.

In particular embodiments, the one or more radio operational tasks comprises one or more of: performing an initial cell search; performing a neighbor cell search; performing time or frequency synchronization; performing channel estimation; optimizing power saving; adapting the wireless device activity to the RS muting pattern; storing the LCAI in a memory; transmitting at least a portion of the LCAI to another wireless device; and transmitting at least a portion of the LCAI to a network node.

In particular embodiments, the coverage area information comprises one or more of a coverage area of one or more cells operating on the carrier frequency, a tracking area, a sector identifier, and a location information. The RS muting pattern information comprises at least one of an indication of a muted bandwidth and an indication of a muted time duration.

According to some embodiments, a method performed by a network node for lean carrier operation comprises determining LCAI. The LCAI comprises one or more of the following sets of information for a carrier frequency: RS muting pattern information, wherein the RS muting pattern information provides a RS muting pattern used in one or more cells on the carrier frequency; and coverage area information, wherein the coverage area information indicates a coverage area where the RS muting is applied or is expected to be applied on one or more cells operating on the carrier frequency. The method further comprises transmitting the LCAI to a wireless device.

In particular embodiments, the LCAI further comprises timing information. The timing information indicates a time during which the RS muting is applied or is expected to be applied on one or more cells operating on the carrier frequency. The LCAI may further comprise carrier frequency information. The carrier frequency information indicates one or more cells in which the RS muting pattern is applied or expected to be applied. The carrier frequency information may be an ARFCN of the carrier frequency.

In particular embodiments, transmitting the LCAI comprises transmitting a MIB or a SIB.

In particular embodiments, the coverage area information comprises one or more of a coverage area of one or more cells operating on the carrier frequency, a tracking area, a sector identifier, and a location information. The RS muting pattern information may comprise at least one of an indication of a muted bandwidth and an indication of a muted time duration. According to some embodiments, a network node is operable to perform lean carrier operation. The network node comprises processing circuitry operable to determine LCAI. The LCAI comprises one or more of the following sets of information for a carrier frequency: RS muting pattern information, wherein the RS muting pattern information provides a RS muting pattern used in one or more cells on the carrier frequency; and coverage area information, wherein the coverage area information indicates a coverage area where the RS muting is applied or is expected to be applied on one or more cells operating on the carrier frequency. The processing circuitry is further operable to transmit the LCAI to a wireless device.

In particular embodiments, the LCAI further comprises timing information. The timing information indicates a time during which the RS muting is applied or is expected to be applied on one or more cells operating on the carrier frequency. The LCAI may further comprise carrier frequency information. The carrier frequency information indicates one or more cells in which the RS muting pattern is applied or expected to be applied. The carrier frequency information may be an ARFCN of the carrier frequency.

In particular embodiments, the processing circuitry is operable to transmit the LCAI by transmitting a MIB or a SIB.

In particular embodiments, the coverage area information comprises one or more of a coverage area of one or more cells operating on the carrier frequency, a tracking area, a sector identifier, and a location information. The RS muting pattern information may comprise at least one of an indication of a muted bandwidth and an indication of a muted time duration.

According to some embodiments, a wireless device is operable to perform lean carrier operation, the wireless device comprises a determining unit and a communicating unit. The determining unit is operable to obtain LCAI. The LCAI comprises one or more of the following sets of information for a carrier frequency: RS muting pattern information, wherein the RS muting pattern information provides a RS muting pattern used in one or more cells on the carrier frequency; and coverage area information, wherein the coverage area information indicates a coverage area where the RS muting is applied or is expected to be applied on one or more cells operating on the carrier frequency. The communicating unit is operable to perform one or more radio operational tasks using the LCAI.

According to some embodiments, a network node is operable to perform lean carrier operation. The network node comprises a determining unit and a communicating unit. The determining unit is operable to determine LCAI. The LCAI comprises one or more of the following sets of information for a carrier frequency: RS muting pattern information, wherein the RS muting pattern information provides a RS muting pattern used in one or more cells on the carrier frequency; and coverage area information, wherein the coverage area information indicates a coverage area where the RS muting is applied or is expected to be applied on one or more cells operating on the carrier frequency. The communicating unit is operable to transmit the LCAI to a wireless device.

Also disclosed is a computer program product comprising a non-transitory computer readable medium storing computer readable program code, the computer readable program code operable, when executed by processing circuitry to perform any of the methods performed by the wireless device described above.

Another computer program product comprises a non-transitory computer readable medium storing computer readable program code, the computer readable program code operable, when executed by processing circuitry to perform any of the methods performed by the network node described above.

Certain embodiments may provide one or more of the following technical advantages. For example, according to certain embodiments, a UE may detect new cells during initial access more power-efficiently and more quickly, even if CRS muting/lean carrier is used in the target cell. According to some embodiments, a UE may detect a target cell faster and more power-efficiently during initial access when the synchronization signals are not located in the cell center frequency.

Another technical advantage provided by embodiments of the present disclosure is that UEs of various capability, categories, or types are enabled to detect the presence of cells. Another advantage provided by embodiments of the present disclosure, enable the UE to adapt other radio resource management (RRM) procedures to the scenario which can make it more reliable, faster and power-efficient. One advantage of transmitting the assistance information according to particular embodiments is that it makes the usage of muted carrier information more reliable. In embodiments where the assistance information is pre-provisioned and the UE uses it in the band scanning process, then the UE knows more accurately when the associated information is valid and can adapt its receiver algorithms accordingly. Otherwise, the same radio frequency channel can be used in different locations or differently over time, and the used algorithm may not be very suitable at that point in time. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
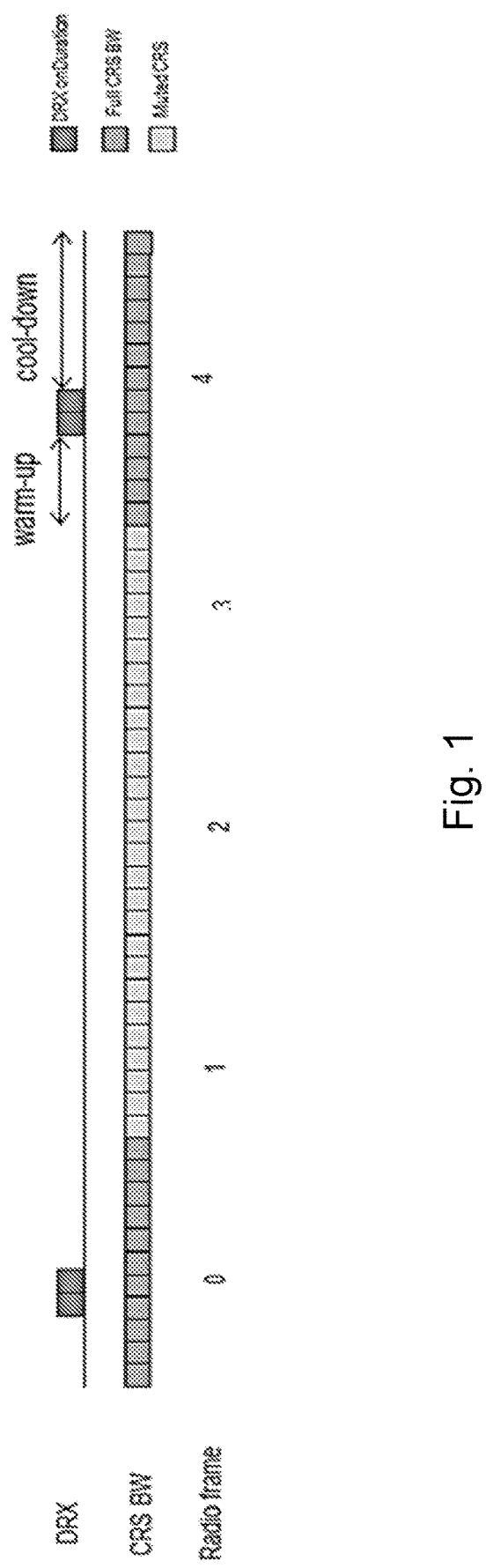
FIG. 1 illustrates one example of CRS muting operation.
Figure 2:
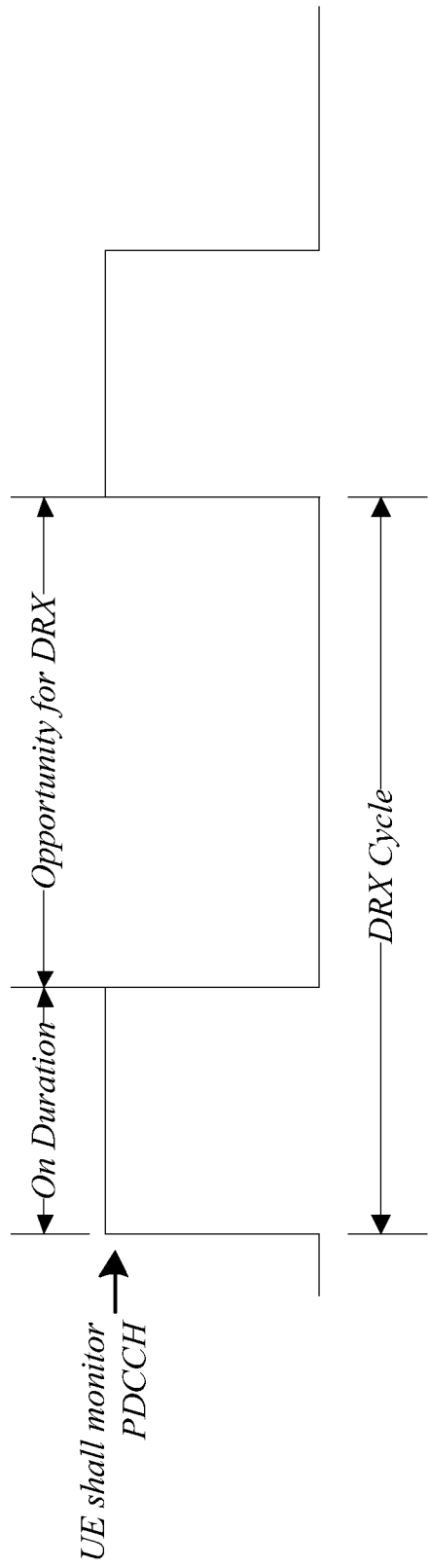
FIG. 2 is a timing diagram illustrating DRX cycle operation in LTE.

As described above, certain challenges currently exist with lean carrier operation. For example, during initial access, a user equipment (UE) has no prior information about the presence of the cell that it is trying to access and is not aware of the center-frequency of the synchronization signals used for cell identification. In some deployments, the center frequencies of the cell and of the synchronization signals may or may not be the same.

A first step for identifying the cell during initial access is to determine the presence of a carrier frequency over which the cell operates. A next step is to identify the cell operating on the determined carrier frequency. This also includes the determination of the center of the synchronization signals.

The first step works fine in legacy systems where the reference signals are always transmitted over the full cell bandwidth. A problem arises, however, where cells employ lean carrier operation. In lean carrier operation, the reference signals can be muted or transmitted only within a certain part of the cell bandwidth. Furthermore, the UE radio frequency bandwidth can be smaller than the cell bandwidth. This makes the legacy method for frequency scanning for initial access unsuitable under these conditions.

Particular embodiments may provide solutions to these or other challenges. For example, in some embodiments a network node and/or a user wireless device may use lean carrier assistance information to improve operational efficiency.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Some embodiments may be performed by a network node, such as an eNB or gNB. According to certain embodiments, a network node may determine a lean carrier assistance information (LCAI) comprising one or more of the following sets of information for one or more (e.g., a group or a range) carrier frequencies F1. The first set includes information about F1 of one or more cells in which the reference signal muting pattern is applied or is expected to be applied. The second set includes information about a reference signal muting pattern used in one or more cells on F1. The third set includes information about a coverage area (A) where the reference signal muting is applied, or is expected to be applied, on one or more cells operating on F1.

In certain embodiments, the LCAI may further compromise the following additional set of information. A fourth set includes information about a timing (T) during which the reference signal muting is applied, or is expected to be applied, on one or more cells operating on F1.

After the network node has determined the LCAI, the network node may transmit the determined LCAI to a UE.

Some embodiments may be performed by a UE. According to certain embodiments, a UE may obtain lean carrier assistance information (LCAI) comprising one or more of the four sets of LCAI information described above with respect to the network node. After the UE has obtained the LCAI, the UE may use the LCAI information to perform one or more operational tasks. The foregoing embodiments will now be described in greater detail.

Particular embodiments determine the LCAI. The first set of information includes frequency information. In certain embodiments, the frequency information is related to the carrier frequency, F1, of one or more cells in which the reference signal muting pattern is applied when the cells transmit signals. Examples of frequency information about F1 include, but are not limited to, frequency channel number, frequency band number, ranges of frequency, among others.

An example of frequency channel number is absolute channel number whose further specific examples are absolute radio frequency channel number ARFCN (e.g., UARFCN in UMTS, EARFCN in LTE, NARFCN in NR). Examples of band numbers are E-UTRA band 1, E-UTRA band 5, etc. Examples of frequency ranges are carrier frequencies between 1800 MHz to 2000 MHz, etc. The carrier frequency may also be referred to as frequency layer or frequency channel. The network node can determine the frequency information based on pre-defined information and/or based on information received from a network node which is aware of the use of reference signal muting on F1. The network node may determine the carrier information for one or more carriers (e.g., F1, F2, etc.) on whose cells the reference signal muting is applied or expected to be applied.

The second set of information includes reference signal muting pattern information. A network node may determine one or more reference signal muting patterns used in one or more cells of F1. For example, one or more reference signal muting patterns can be pre-defined, and the network node can obtain information about one of the reference signal muting pattern used in cells of F1. The reference signal muting pattern may indicate, for example, the muted or unmuted bandwidth, bandwidth parts, or subbands within a system bandwidth.

Reference signal muting in this context means that the reference signals are not transmitted over the entire cell bandwidth in all the time resources. Instead, the reference signal is transmitted only in certain part of the cell bandwidth (BW2). The part of BW2 over which the reference signal is transmitted in time resources where the reference signal is muted is called a first BW (BW1), where BW2<BW1.

Information on whether muting of a reference signal is or expected to be employed in a cell on F1 can be determined by the network node based on pre-defined information and/or by receiving information about the RS muting from another network node. In this case different reference signal muting patterns can be expressed in terms of a pre-defined identifier. The reference signal muting pattern can also be expressed in terms of actual bandwidths of the reference signal during the time resources when the reference signal muting is applied and/or during the time resources when the reference signal muting is not applied.

The reference signal muting can be enabled based on received information from other nodes in the network such as core network node, third-party node, etc. The muting can also be enabled in the network by operator configuration or it can be enabled based on certain criteria (e.g., when traffic load in the cell is low such as the number of UEs in the cell is below threshold or resource utilization is below a threshold).

The obtained reference signal muting pattern information may also reveal information on whether the reference signal muting is employed in time-domain, frequency-domain or in both. Muting in frequency-domain means that the reference signal can be transmitted in only a subset of physical resource blocks (PRBs) of the cell1's bandwidth (e.g., the reference signal is transmitted in the central 6 PRBs of cell1 bandwidth while they are muted over the remaining PRBs of cell1 bandwidth).

Another example is the when the base station knows the connected UE is RF bandwidth limited (e.g., 6PRB or 24PRB) according to the capability or UE category. For these UEs, the base station can mute the reference signals outside PRBs that the UE can receive. However, the reference signal transmission bandwidth can vary with the time. Time-domain muting means that the reference signal can be muted completely or partly over time. In one example, the muting of the reference signal is applied or is expected to be applied only in a first set of time resources (R1) of cell1, while no reference signal muting is applied in a second set of time resources (R2) of cell1. The set of R1 may either consist of consecutive set of time resources or non-consecutive set of time resources. Similarly, the set of R2 may either consist of consecutive set of time resources or non-consecutive set of time resources.

Examples of time resource are radio frames, subframes, transmission time interval (TTI), slot, mini-slot, symbols, etc. The time resources R1 and R2 are non-overlapping. In one specific example, muting of the RS is applied or expected to be applied in all subframes of a radio frame of cell1 over one or set of radio frames which can be consecutive or non-consecutive. In another specific example, the muting of the RS is applied or expected to be applied in subset of subframes within any set of the radio frames of cell1. for example, the reference signal muting is applied only in subframes 0 and 5 or is applied in subframes 0, 4, 5 and 9. In yet another example, the reference signal muting is applied over a duration of N1 number of radio frames within Nt number of radio frames, while no RS muting is applied over the remaining duration of N2 number of radio frames within Nt where Nt=N1+N2.

TABLE 1 includes an example of different reference signal muting patterns, which can be pre-defined. The reference signal muting pattern actually used on F1 can be communicated as part of the associated information (e.g., LCAI) using the identifier of the selected or determined reference signal muting pattern.

TABLE 1

Example of muting pattern ID as part of associated information

| Muting pattern ID | Description |
| --- | --- |
| 00 | RS transmitted bandwidth is 0 PRBs, i.e. RS transmissions are fully blanked except for center 6PRB. |
| 01 | RS transmitted bandwidth is 6 PRBs, i.e. no RS transmissions over the remaining part during low UE activity. |
| 10 | RS transmitted bandwidth is 24 PRBs, i.e. no RS transmissions over the remaining part during low UE activity. |
| 11 | No muting applied. |

Figure 3:
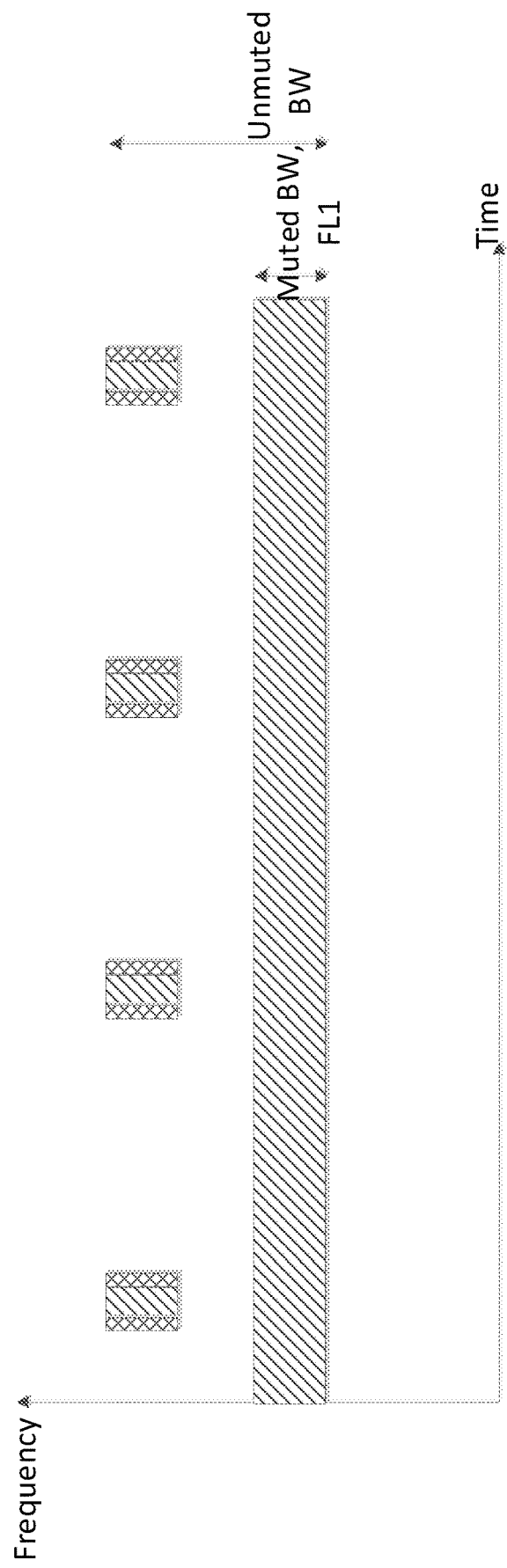
FIGS. 3-5 illustrate different reference signal muting patterns.
Figure 4:
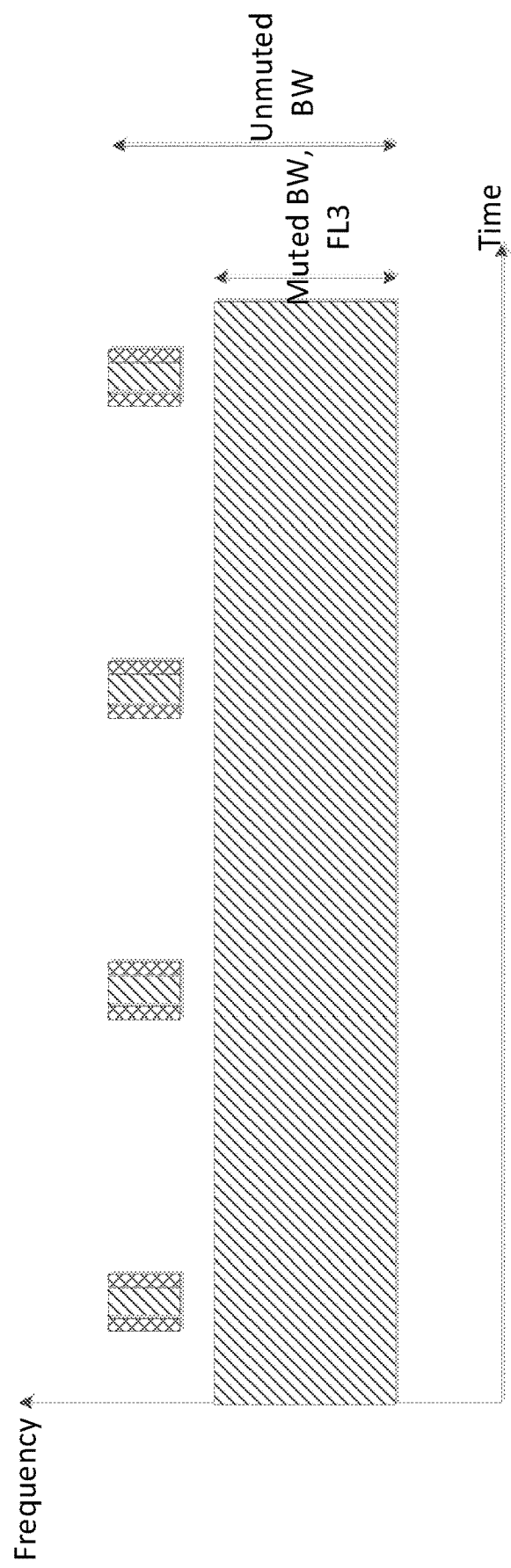
Figure 5:
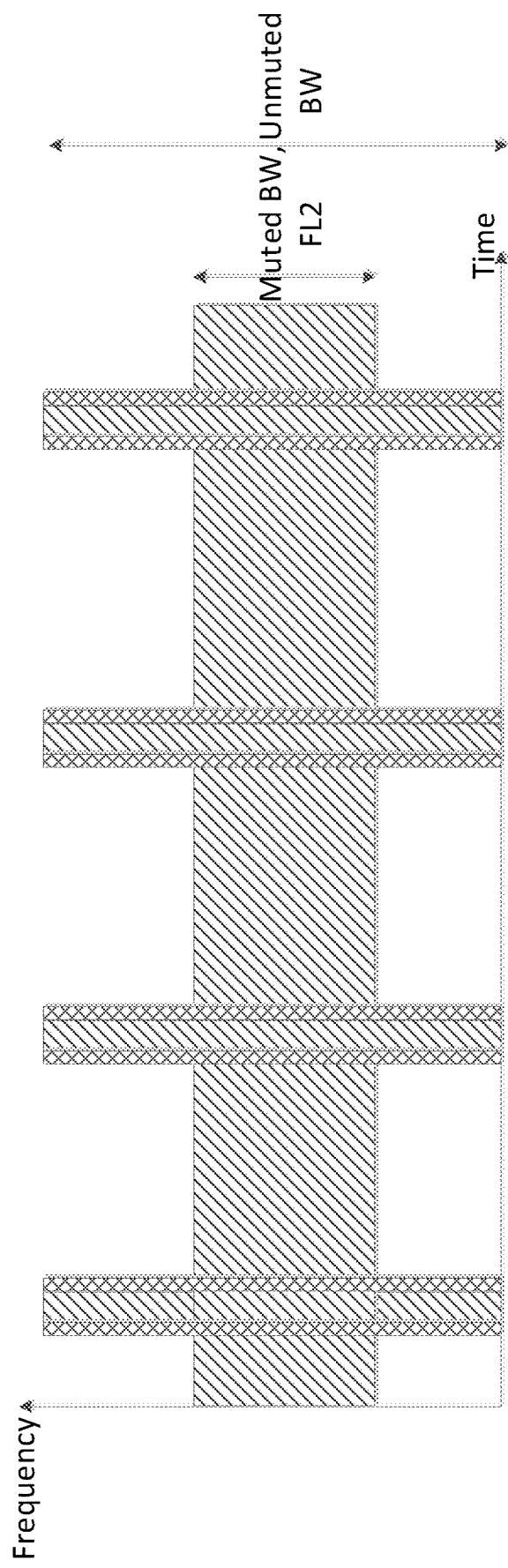

FIGS. 3 through 5 illustrate different reference signal muting patterns. The difference between FIGS. 3 and 4 is that in FIG. 4 the muting bandwidth is larger as in pattern #10 compared to pattern #01 in FIG. 3. In FIG. 5, unmuted bandwidth is same as cell bandwidth. FIG. 3 may correspond the muting applied when only category M1 UEs are present in a cell, FIG. 4 may correspond to muting applied for category M2 UEs, and FIG. 5 may correspond to muting applied for legacy UEs.

In some embodiments the network node also adapts or determines or selects the reference signal muting pattern based on, for example, the UE activity level, as described by the following examples. The network node may obtain information related to UE activity level of the determined location. For example, the obtained location information may indicate that cell1 is located in an airport, and the UE activity information may indicate that there is high UE activity during certain times (i.e., peak hours) of the day (e.g., after flight arrival or before flight departures).

In another example, if cell1 is near a country border, the UE activity information may indicate that there is high UE activity during the certain times of the day (e.g., rush/peak hours where people may drive to another country for work (such as 7-9 AM, 16-18 PM). Similar locations where the UE activity may depend on the different occasions may include, for example, rail-way stations, concerts, etc.

UE activity level information may be obtained from third-party sources/nodes, pre-defined or configured by the operator. The activity level can also be autonomously determined by historical data, collecting statistics of identified signals, random access channel (RACH) requests, cell change (handover, cell-reselection) requests, etc. In one specific example, if a number of received RACH requests or cell change requests in cell1 is greater than a certain value during a certain time of the day, then the UE activity level can be considered to be high. TABLE 2 includes examples of obtained UE activity level.

TABLE 2

Example of determined UE activity level in cell1

| Time/occasions in cell1 | UE activity level |
| --- | --- |
| 7-9 AM, 16-18 PM | High |
| 18 PM-7 AM, 9 AM-16 PM | Low |
| Weekend | High |
| New year, Christmas | High |
| Otherwise/default value | Low |

The network node uses the result of the comparison of geographical location and determined UE activity level to adapt the reference signal transmissions.

At a high level, the adaptation can be described as follows: if the comparison shows that cell1 is deployed in one of the identified areas (e.g., busy areas like airport, country borders, etc.) and UE activity level is high, then the network node transmits the reference signal over a larger cell bandwidth (e.g., over the entire cell bandwidth). If the comparison shows that cell1 is not in one of the identified areas, then the network node uses the current reference signal transmission pattern in cell1, which means that the network node may transmit the reference signal over reduced bandwidth as in a lean carrier operational mode regardless of the UE activity level. Additional examples are described below.

To further illustrate using a non-limiting example, cell1 may be deployed in an airport or near an airport such that it is under coverage of cell1. A typical day at an airport includes people arriving from different countries and switching on their devices at arrival. The devices may belong to different categories, and their home operator may be different, which means the devices may have different capabilities. For example, some UEs may have 1 receiver antenna while others may have 2 or more receiver antennas. The various UEs may also support different features. For example, one UE may support lean carrier operational mode while others may not. The UEs may support different RATs—one UE may only be capable of high-speed packet access (HSPA) while others may support LTE. Thus, a large variety of UEs with different capabilities and different subscriptions may be switched on in the same or similar locations.

Initial access might be a problem for UEs under cells which are operating under lean carrier operational mode. To be able to assist the UEs that are not aware of the lean carrier operational mode in the target cell (i.e., RS transmissions over reduced bandwidth) with the initial cell access (also known as frequency scanning), the network sends the reference signal transmissions in certain areas (airport in this case) at certain occasions. This has several advantages. One, it solves the problem of not being able to detect a target cell under lean carrier mode. Two, it quickens the initial cell search procedure because the UE is able detect the transmitted energy (PSD) over a larger bandwidth. Three, this can result in reduced power consumption in the UE. By transmitting the reference signal transmissions only over certain occasions (e.g., during high activity times), the gain of lean carrier feature may still remain (e.g., reduced inter-cell interference, possibility to use higher order modulation) while this embodiment still enables support of various type of UEs.

The foregoing example described with respect to an airport is illustrative of an embodiment where the network can selectively transmit the reference signals based on determined location and activity level to assist the various types of UEs to access the cell. Other non-limiting examples may include railway stations, highways, country borders, etc. For example, in the case of highways, the UEs can be moving between coverages of different operators which may in turn support different features. This means a UE which has been operating under a cell where the reference signals were transmitted over full cell bandwidth can experience difficulties detecting the new cell where the new operator may have lean carrier enabled. To assist the UEs in detecting the cell, the network may transmit the reference signal over a larger bandwidth in places like a highway at certain times where UEs are moving from one operator coverage area to another.

Figure 6:
FIG. 6 illustrates example scenarios where a reference signal is transmitted over reduced bandwidth over a period of T1 followed by reference signal transmission over full cell bandwidth over a period of T2.

FIG. 6 illustrates example scenarios (e.g., airport, railway station, highways, country borders) where the reference signal is transmitted over reduced bandwidth over a period of T1, followed by reference signal transmission over full cell bandwidth over a period of T2, and this pattern is then repeated based on comparison result in step 2 of particular embodiments.

In other examples, the network node may transmit reference signals over a certain part of the cell bandwidth as part of the reference signal muting pattern which is smaller than the full bandwidth from time to time, for example, depending on band type. In yet other examples, the network node may transmit the reference signal over larger bandwidth as part of the reference signal muting pattern if the comparison shows that cell1 is located within a certain distance (e.g., 200 m) to at least one of the identified locations/places and/or when the determined UE activity level is expected to be high or greater than a certain threshold. This means that the identified place does not necessarily have to be within the coverage area, but nearby. Transmitting the reference signal might still be necessary because it is likely that UEs from the identified areas might enter the coverage area of cell1.

The third set of information includes coverage area information. According to some embodiments, the coverage area information comprises information about the geographical region, area, or location in which the reference signal muting pattern is applied on the determined carrier, F1. Examples of coverage area information include cell information (e.g., PCI, ECGI, etc. of one or a group of cells), tracking area (such as tracking area ID), sector information or sector ID, geographical coordinates (e.g., 2-dimensional or 3-dimensional), GAD (Geographical Area Description) shapes (e.g., ellipsoid, polygon, ellipsoid arc, etc.), address information, identification of city or location (e.g., city name, district name, postal code, etc.), information of a well-known location (e.g., identity, address, or name of shopping mall, airport, railway station, etc.), a road map or road identifier.

A coverage area may also be an area that is covered by multiple cells or tracking areas, in which case the coverage information comprises a set of identifiers which may further be associated with measurements (fingerprints). The coverage area may be indicated using absolute coordinates referring to the shape of the coverage area. It may also be referred using cell ID range or cell type which can, for example, be macro-, micro- or femto cells.

In some embodiments, the location information may be indicated using absolute coordinates of an area where muting is applied on the associated radio frequency channel number. Location information may comprise a geographical area, such as a specific city, specific place airport, railway station, country border, etc. The information may be expressed in terms of GNSS coordinates. Examples of GNSS systems are GPS, Galileo, etc. and corresponding location coordinates can be expressed in terms of GPS coordinates, Galileo coordinates, etc.

The network node determines its geographical location where cells with reference signal muting is deployed and transmitting the reference signal. The embodiment is based on the assumption that reference signals are transmitted over reduced bandwidth (e.g., as in lean carrier operation) in cell1. The determination can be based on detected GPS signals, satellites signals, information obtained from positioning servers, from other network nodes (e.g., core network node, from neighbor network nodes over X2 signaling), or based on signals from other UEs in the area.

In some embodiments, the network nodes are deployed in fixed locations, and therefore the location information can be configured in the network itself (e.g., by the operator). In another example, the network can determine the location information based on detected GPS signals, whether it is deployed in, for example, country border, airports, highways, etc.

In yet another example, the network node may determine its location based on received UE requests. For example, if the network node is receiving a large number of random access requests by UEs in a certain area, (and/or in a certain time), then it can, for example, depend on people arriving at an airport and switching on their UEs. This may be an indication that the network is deployed in a busy area or central area such as an airport.

In other example, if the network is receiving a large number of roaming requests from UEs belonging to other operators, then it can be an indication that the network is deployed in a country-border, airport, highway, etc. The network node may also combine the received requests/information (e.g., combine both random access requests and roaming requests) to better determine its location. In some embodiments, the network node may determine its location based on detected signals from other UEs and/or network nodes.

In some embodiments, a network node compares the determined location to a list of predefined, configured, or known locations or places. Examples of such locations/places are airport areas, railway stations, highways, country borders, etc. Typically, these places are well-known, and their geographical locations are often mapped, such as in Google maps. For example, the locations of airports, railway stations are often clearly marked in maps. The network node can also maintain its own list which, for example, may be configured by the network operator.

In another example, the reference signal muting information associated with locations may be obtained by drive test, or by a third party. In another example, the reference signal muting information may be collected via UE reporting such information together with their locations.

The fourth set of information includes timing related information. Timing information may comprise validity time period/duration (T0) during which the determined reference signal muting pattern used in one or more cells on F1 is valid. This can be expressed in terms of a starting reference time (Tr) and the validity time duration (T0) or reference signal muting periodicity. The parameter Tr defines the reference time when the reference signal muting pattern is activated or started in the cell. T0 defines the time period/duration over which the reference signal muting is applied starting from Tr.

Examples of starting reference time (Tr) are certain UTC time, GNSS reference time, SFN (e.g., SFN=0 of a reference cell, such as of serving cell) etc. Examples of T0 are X1 number of time resources, X2 seconds, X3 minutes, X4 hours, X5 days, etc. T0 can also be expressed in terms of unspecified time, applicable till further orders, etc. It can also be a relative information, e.g. during certain days of the month or year (such as salary payout, New Year, Christmas, etc.). Another example of timing information may include a time domain pattern that indicates the availability and/or non-availability of reference signal transmissions over larger bandwidth or full cell bandwidth. In one specific example, this can be done using the subframe, radio frame or SFN number where muting is applied or not applied. In yet another example, the timing information may comprise a certain rule according to which the muting on associated carrier is enabled.

Particular embodiments include lean carrier assistance information (LCAI). The following are example embodiments of LCAI determined by a network node. An example of the combined information (e.g., LCAI) which is transmitted to the UE is shown in TABLE 3. In some embodiments, the coverage area information and location information can be the same, but in other cases they may not be the same. For example, if PCI is used to refer to the coverage area, then the same PCI may be reused in another place. Then combining this information with location information can make the application of received information more reliable (e.g., using the location information to determine which PCI of multiple same PCI). Likewise, the same frequency channel number can be used in multiple places, and combining the frequency channel information with coverage/location information can make application of received information more reliable.

TABLE 3

Example of LCAI containing information about the RS muting pattern, carrier frequency, location and validity time

| Frequency channel number (e.g. EARFCN) | Coverage area | Location | Timing | | Muting pattern |
|---|---|---|---|---|---|
| | | | Duration | Starting reference time | |
| 1 | PCIs = 100-128 | Stockholm Airport | 24 hours | Current time | 01 |
| 1 | PCI = 130-190 | Central station | 12 hours | Starting from 10.00 am on current day | 10 |
| 1 | All PCIs | Mall of Scandinavia | 10 hours | Starting from 10.00 on current day | 11 |

Particular embodiments include transmitting LCAI. For example, after the network node has determined the LCAI, in certain embodiments, the network node may transmit the determined LCAI to a UE. The term transmitting herein includes transmitting, signaling, configuring or pre-configuring the obtained information from previous steps. In certain embodiments, the LCAI can be signaled to the UE via higher layer signaling such as RRC messages or via lower layer messages such as via MAC command.

There are many advantages to informing the UEs about the muted carriers and its associated information. One of the many advantage is that it can help the UE to adapt its receiver behavior according to the received information. Carrier information together with assistance information makes the use of the information more reliable because the UE knows where and when the muting is applied.

Particular embodiments include obtaining LCAI. The contents and examples of LCAI containing sets 1-4 as described above are also applicable for the LCAI obtained by a UE. In certain embodiments, a UE may obtain the LCAI using any suitable technique. In some embodiments, the UE may receive the LCAI from a network node. For example, the UE may receive a configuration message from the network node. Non-limiting examples of configuration messages are RRC signaling, NAS signaling, MAC command, among others. Examples of network node are serving network node (e.g., serving the UE), neighboring network node, core network node (e.g., MME), etc.

In certain embodiments, the UE may obtain the LCAI through pre-provisioning. For example, the UE may retrieve LCAI that is pre-stored in the UE memory such as on the SIM or USIM card of the UE. The information can be pre-stored, for example, by means of an application program.

In some embodiments, the UE may obtain the LCAI using historical data or statistics, for example, information collected and used by the UE in the past.

Particular embodiments include using the LCAI. In certain embodiments, the UE uses the obtained LCAI information for performing one or more radio operational tasks. The UE may perform any suitable task using the LCAI. For example, the UE may use the reference signal muting information for performing an initial cell search, for example, band scanning. In certain embodiments, the UE may obtain the LCAI information, including reference signal muting information, by retrieving the information from a pre-stored location such as the UE's SIM/USIM card. The UE receiver may adapt the sample duration for detecting the presence of the energy based on the periodicity of the time resources which are not muted—that is, contain a reference signal over full bandwidth.

In certain embodiments, the UE may use reference signal muting information for performing neighbor cell search. For example, the UE may perform correlation over full CRS bandwidth in unmuted time resources for verifying the detected PCI of the neighbor cell.

In certain embodiments, the UE may enhance the time and/or frequency synchronization based on the reference signal by correlating over the appropriate bandwidth (e.g., over 6 RBs in muted time resources and over full bandwidth of the cell in unmuted time resources).

In certain embodiments, the UE may use the LCAI information to enhance the channel estimation.

In certain embodiments, the UE may use the LCAI information to enhance reference signal interference mitigation by mitigating reference signal inference from an interfering cell. By knowing the bandwidth of the reference signal in different time resources, the UE can detect the reference signal interference more accurately. This facilitates the UE to eliminate or minimize the reference signal interference caused by the interfering cell at the UE on signals received from the serving cell.

In some embodiments, the UE may use the LCAI information to optimize power saving and adapting its activity to the muting pattern.

In some embodiments, the UE may store the lean carrier operation information comprised in the obtained LCAI. In some embodiments, the UE may send/transmit the lean carrier operation information comprised in the obtained LCAI to another UE or a network node.

Figure 7:
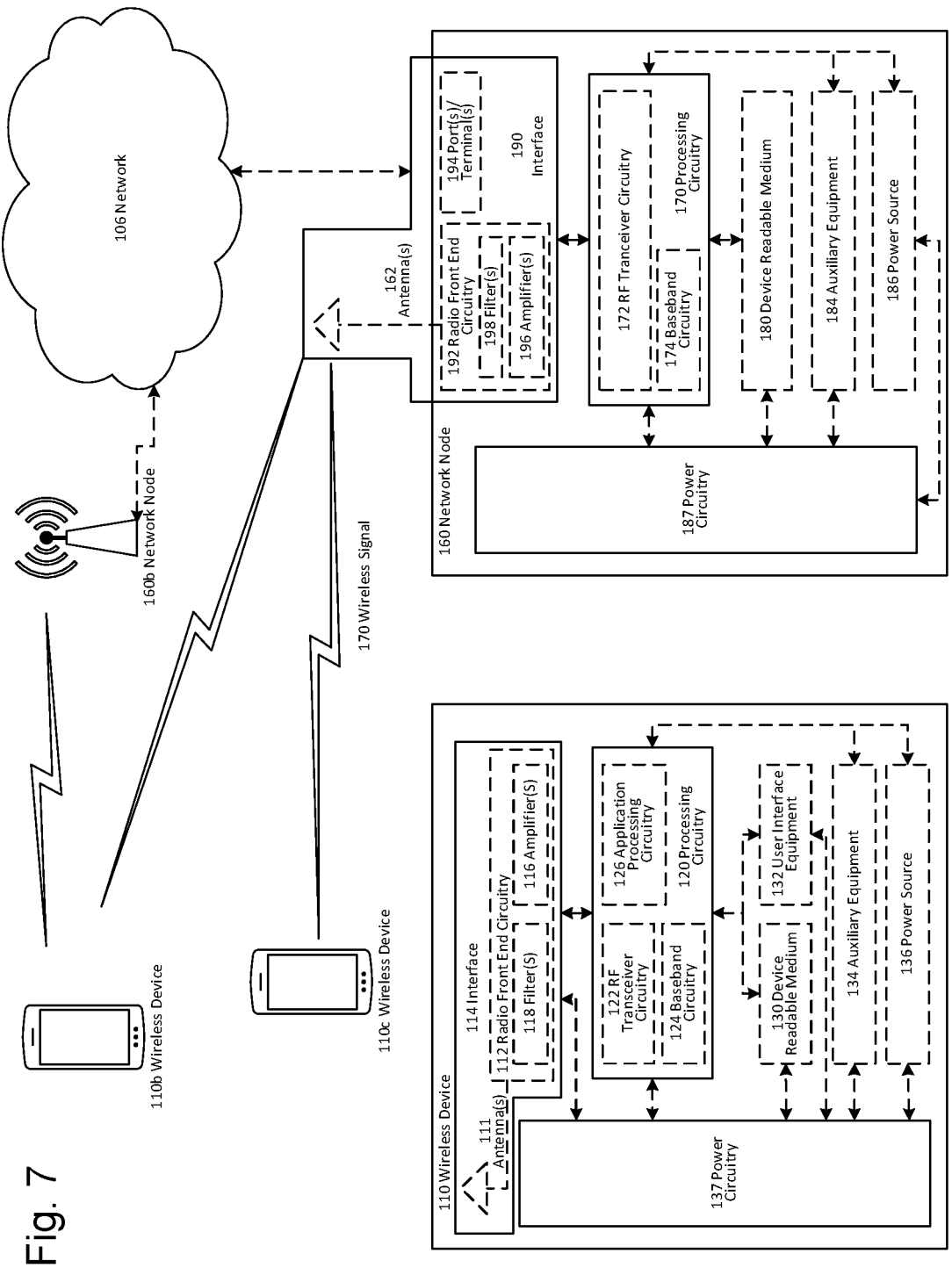
FIG. 7 is a block diagram illustrating an example wireless network.

FIG. 7 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 160 includes processing circuitry 170, device readable medium 180, interface 190, auxiliary equipment 184, power source 186, power circuitry 187, and antenna 162. Although network node 160 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 7 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device.

Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 8:
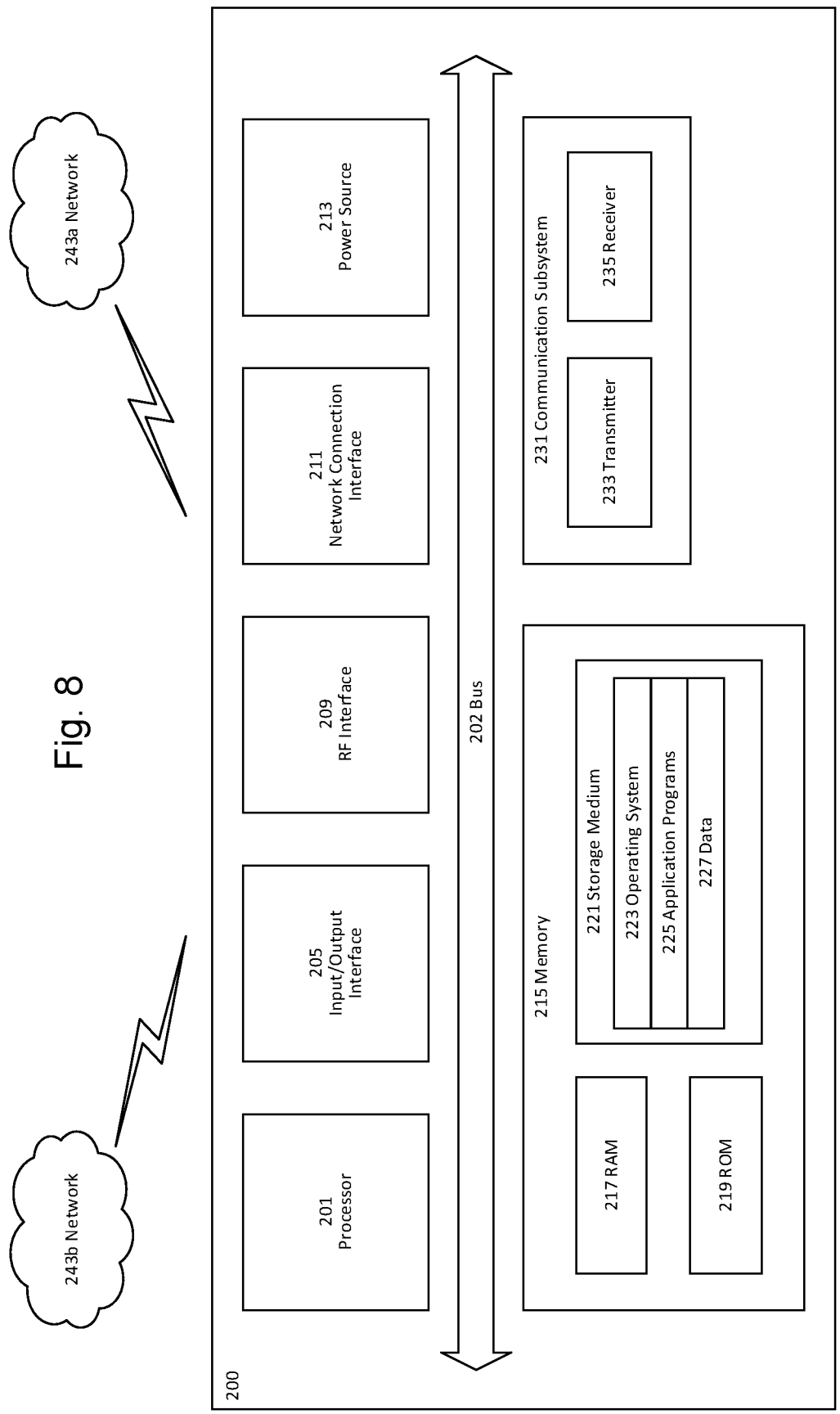
FIG. 8 illustrates an example user equipment, according to certain embodiments.

FIG. 8 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may use all the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 8, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 9:
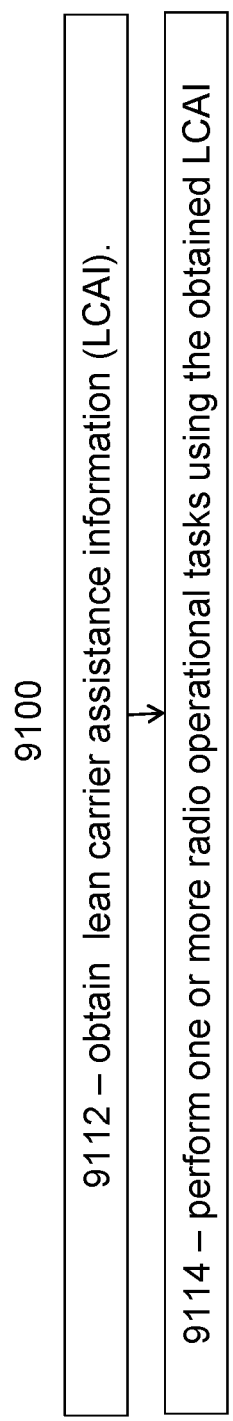
FIG. 9 is flowchart illustrating an example method in a wireless device for lean carrier operation, according to certain embodiments.

FIG. 9 is a flowchart illustrating an example method in a user equipment for lean carrier operation, according to certain embodiments. In particular embodiments, one or more steps of FIG. 9 may be performed by wireless device 110 described with respect to FIG. 7.

The method begins at step 9112, where the wireless device (e.g., wireless device 110) obtains LCAI. The LCAI comprises one or more of the following sets of information for a carrier frequency: RS muting pattern information, wherein the RS muting pattern information provides a RS muting pattern used in one or more cells on the carrier frequency; and coverage area information, wherein the coverage area information indicates a coverage area where the RS muting is applied or is expected to be applied on one or more cells operating on the carrier frequency.

In some embodiments, the LCAI further comprises timing information. The timing information indicates a time during which the RS muting is applied or is expected to be applied on one or more cells operating on the carrier frequency. The LCAI may further comprise carrier frequency information. The carrier frequency information indicates one or more cells in which the RS muting pattern is applied or expected to be applied. The carrier frequency information may be an ARFCN of the carrier frequency.

In particular embodiments, the coverage area information comprises one or more of a coverage area of one or more cells operating on the carrier frequency, a tracking area, a sector identifier, and a location information. The RS muting pattern information comprises at least one of an indication of a muted bandwidth and an indication of a muted time duration.

In particular embodiments, obtaining the LCAI includes one or more of the following: receiving the LCAI from a network node; obtaining pre-provisioned LCAI from memory; determining the LCAI using historical data; and receiving the LCAI from another wireless device. The LCAI may be received from the network node via a MIB or a SIB.

In particular embodiments, the LCAI may include any of the four information sets described herein.

At step 9114, the wireless device performs one or more radio operational tasks using the LCAI. For example, wireless device 110 may perform one or more of: performing an initial cell search; performing a neighbor cell search; performing time or frequency synchronization; performing channel estimation; optimizing power saving; adapting the wireless device activity to the RS muting pattern; storing the LCAI in a memory; transmitting at least a portion of the LCAI to another wireless device; and transmitting at least a portion of the LCAI to a network node.

Modifications, additions, or omissions may be made to method 9100 of FIG. 9. Additionally, one or more steps in the method of FIG. 9 may be performed in parallel or in any suitable order.

Figure 10:
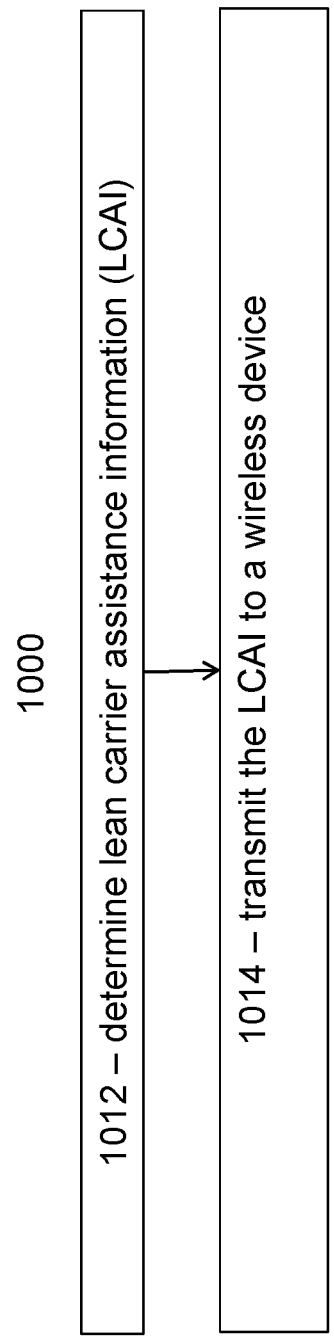
FIG. 10 is a flowchart illustrating another example method in a wireless device for lean carrier operation, according to certain embodiments.

FIG. 10 is a flowchart illustrating an example method in a network node for lean carrier operation, according to certain embodiments. In particular embodiments, one or more steps of FIG. 10 may be performed by network node 160 described with respect to FIG. 7.

The method begins at step 1012, where the network node (e.g., network node 160) determines LCAI. The LCAI may comprise any of the LCAI described with respect to step 9112 of FIG. 9.

At step 1014, the network node transmits the LCAI to a wireless device. For example, network node 160 may transmit the LCAI to wireless device 110.

Modifications, additions, or omissions may be made to method 1000 of FIG. 10. Additionally, one or more steps in the method of FIG. 10 may be performed in parallel or in any suitable order.

Figure 11:
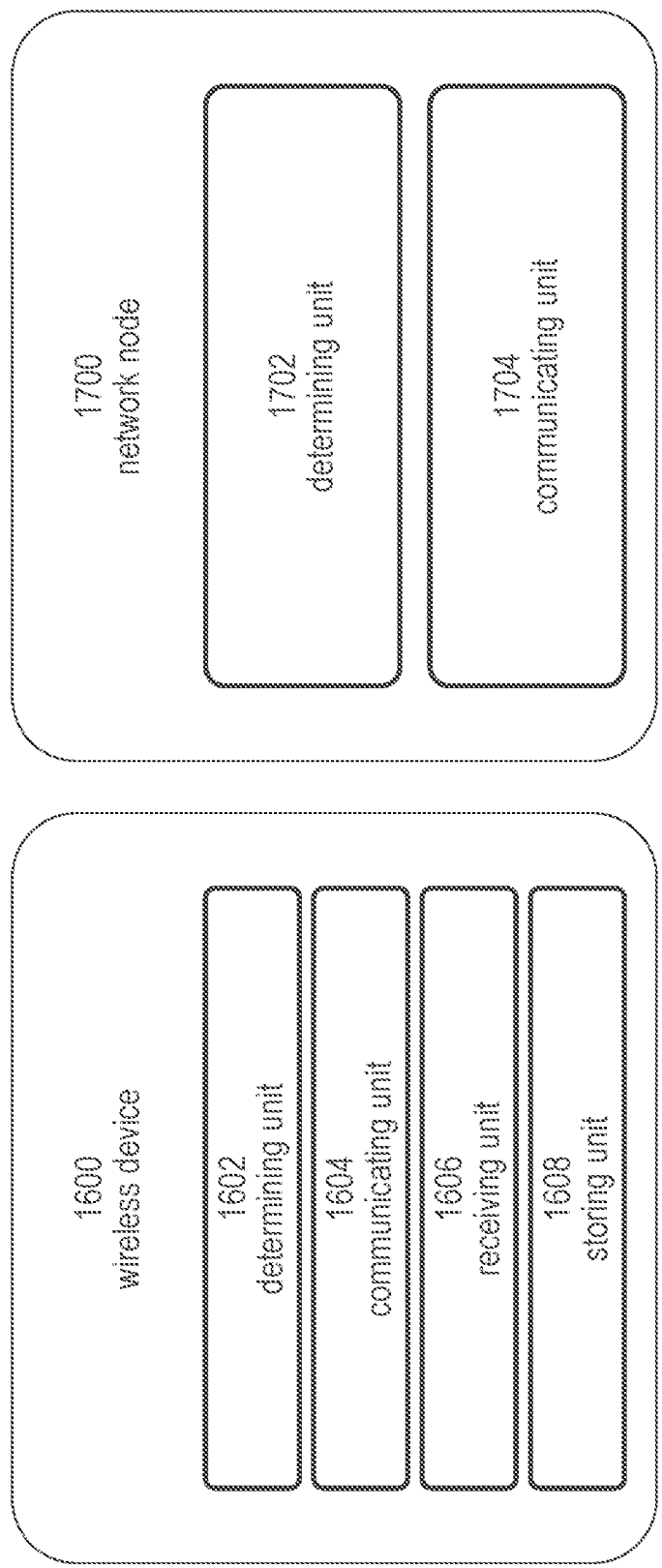
FIG. 11 illustrates a schematic block diagram of an apparatus in a wireless network, according to certain embodiments.

FIG. 11 illustrates a schematic block diagram of two apparatuses in a wireless network (for example, the wireless network illustrated in FIG. 7). The apparatuses include a wireless device and a network node (e.g., wireless device 110 or network node 160 illustrated in FIG. 7). Apparatuses 1600 and 1700 are operable to carry out the example methods described with reference to FIGS. 9 and 10, respectively, and possibly any other processes or methods disclosed herein. It is also to be understood that the methods of FIGS. 9 and 10 are not necessarily carried out solely by apparatus 1600 and/or apparatus 1700. At least some operations of the method can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause determining unit 1602, communicating unit 1604, receiving unit 1606, storing unit 1608, and any other suitable units of apparatus 1600 to perform corresponding functions according one or more embodiments of the present disclosure. Similarly, the processing circuitry described above may be used to cause determining unit 1702, communicating unit 1704, and any other suitable units of apparatus 1700 to perform corresponding functions according one or more embodiments of the present disclosure.

As illustrated in FIG. 11, apparatus 1600 includes determining unit 1602 configured to obtain or determine LCAI. Apparatus 1600 also includes communicating unit 1604 configured to receive or transmit LCAI. Apparatus 1600 also includes receiving unit 1606 configured to receive reference signals. Apparatus 1600 also include storing unit 1608 for storing pre-configured or received LCAI.

As illustrated in FIG. 11, apparatus 1700 includes determining unit 1702 configured to determine LCAI. Apparatus 1700 also includes communicating unit 1704 configured to transmit LCAI to a wireless device.

Figure 12:
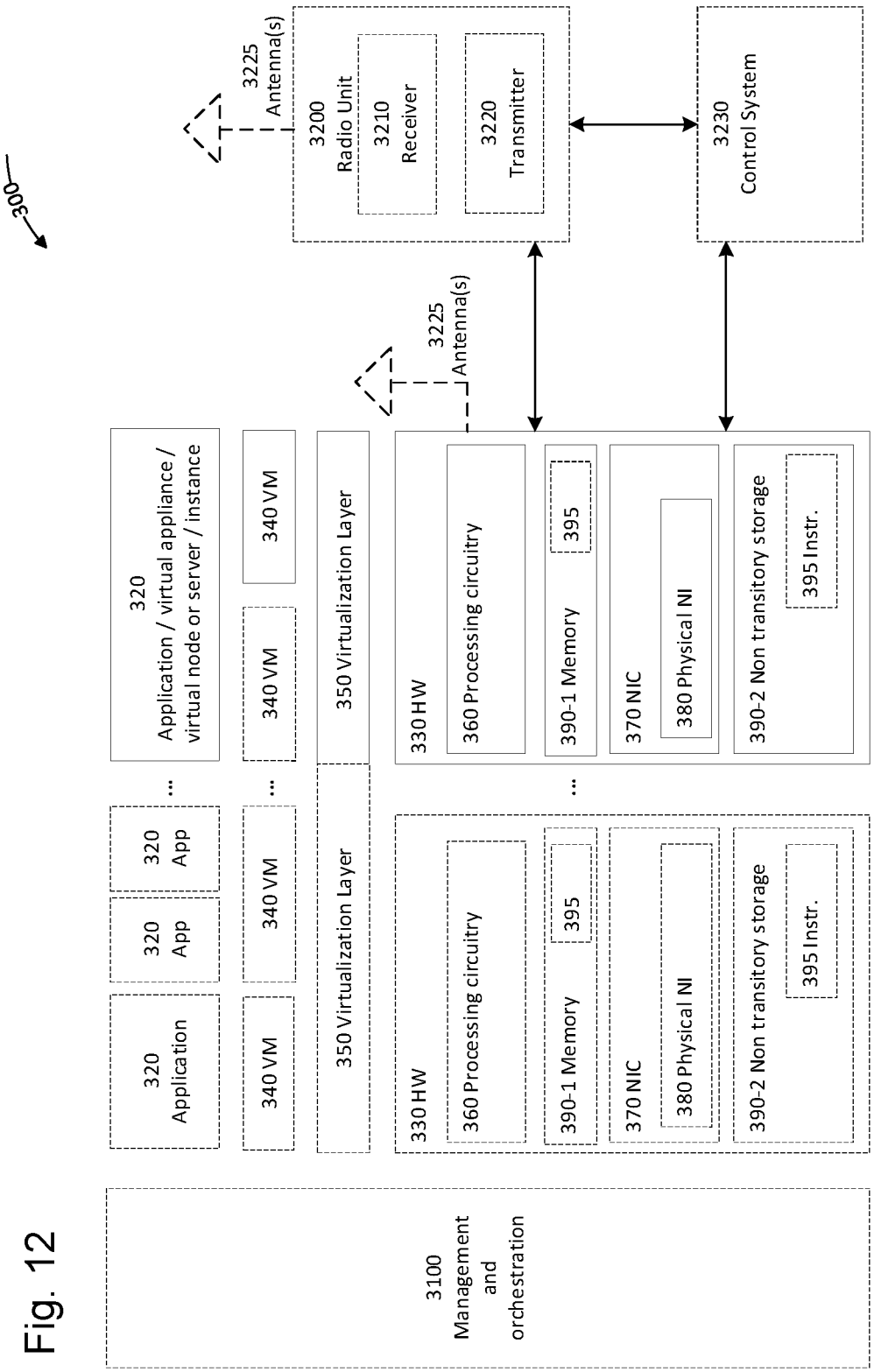
FIG. 12 illustrates an example virtualization environment, according to certain embodiments.

FIG. 12 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 12, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Figure 18:
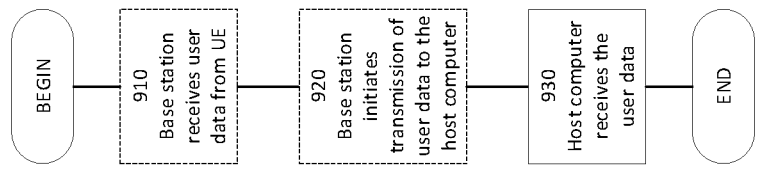
FIG. 18 is a flowchart illustrating a method implemented in a communication system, according to certain embodiments.

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 13:
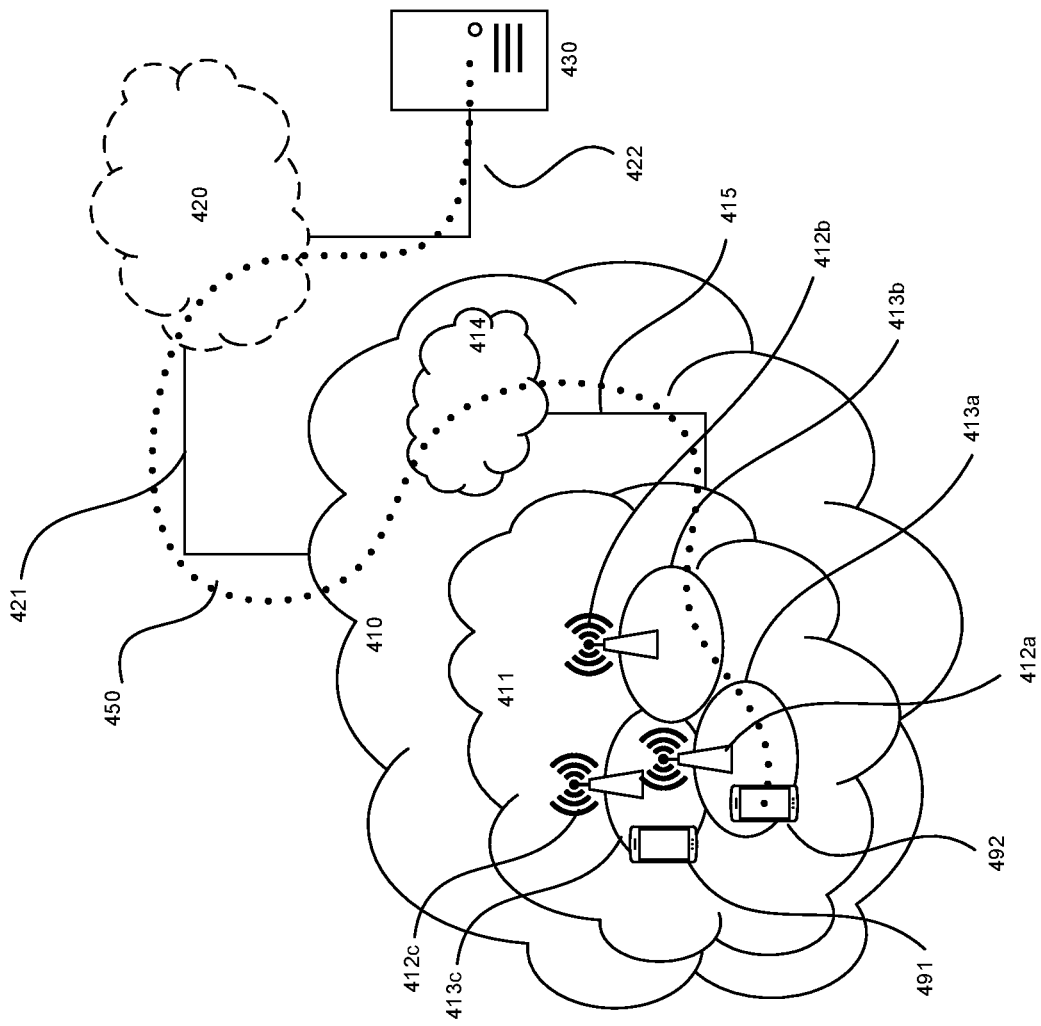
FIG. 13 illustrates an example telecommunication network connected via an intermediate network to a host computer, according to certain embodiments.

With reference to FIG. 13, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 13 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 14:
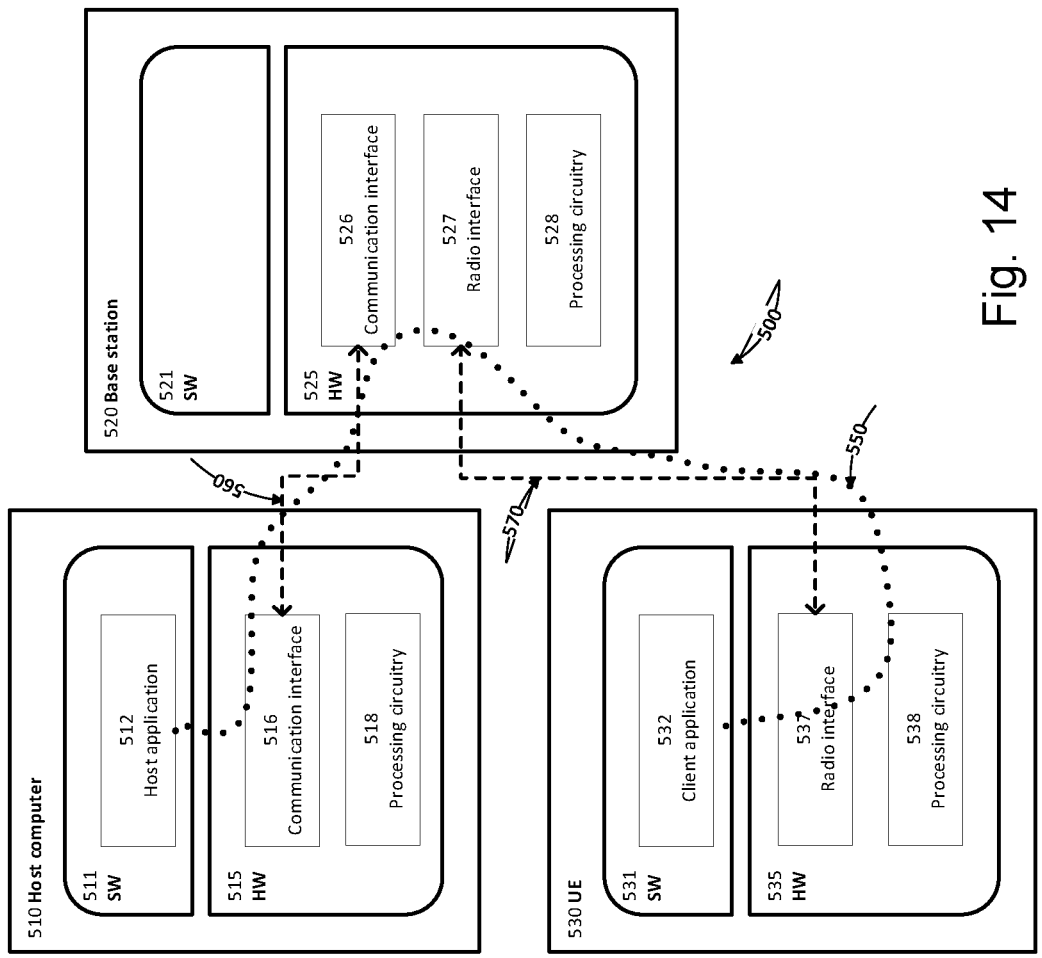
FIG. 14 illustrates an example host computer communicating via a base station with a user equipment over a partially wireless connection, according to certain embodiments.

FIG. 14 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 14. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 14) served by base station 520. Communication interface 526 may be configured to facilitate connection 560 to host computer 510. Connection 560 may be direct, or it may pass through a core network (not shown in FIG. 14) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 14 may be similar or identical to host computer 430, one of base stations 412a, 412b, 412c and one of UEs 491, 492 of FIG. 7, respectively. This is to say, the inner workings of these entities may be as shown in FIG. 11 and independently, the surrounding network topology may be that of FIG. 7.

In FIG. 14, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 15:
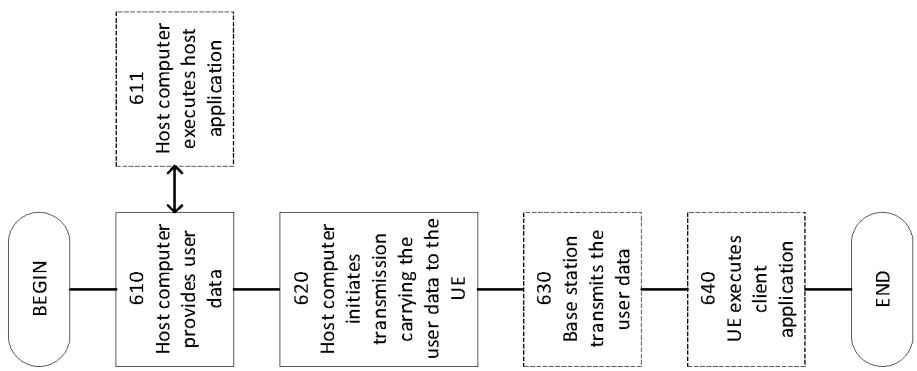
FIG. 15 is a flowchart illustrating a method implemented, according to certain embodiments.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 16:
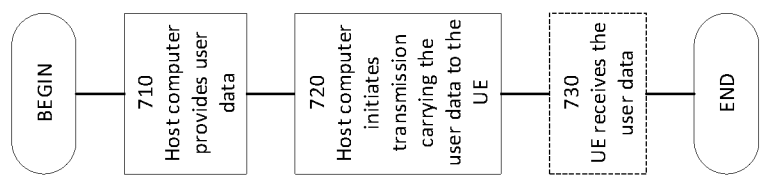
FIG. 16 is a flowchart illustrating a method implemented in a communication system, according to certain embodiments.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 17:
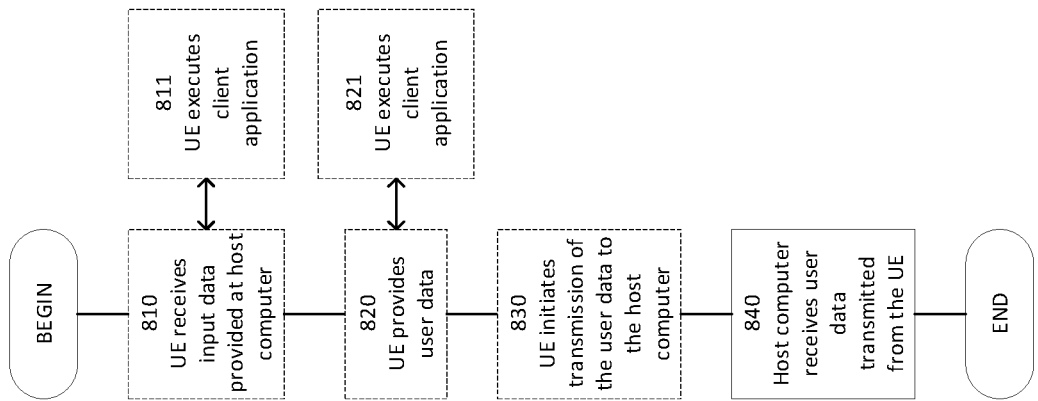
FIG. 17 is a flowchart illustrating a method implemented in a communication system, according to certain embodiments.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a more general term "network node" is used and it can correspond to any type of radio network node or any network node, which communicates with a UE and/or with another network node. Examples of network nodes are NodeB, MeNB, SeNB, gNode B, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT etc.

In some embodiments the non-limiting terms UE or a wireless device are used interchangeably. The UE herein can be any type of wireless device capable of communicating with a network node or another UE over radio signals. The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, Multi-cell/multicast Coordination Entity (MCE), relay node, access point, radio access point, Remote Radio Unit (RRU) Remote Radio Head (RRH).

In some embodiments the UE may be configured with PCell and PSCell or with PCell, PSCell and one or more SCells such as in dual connectivity and/or carrier aggregation. The configured cells are UE specific aka serving cells of the UE.

In some embodiment the term layer is used, and it may correspond to any carrier frequency on which one or more cells operate and can transmit and/or receive signals. The UE can perform one or more measurements on signals of one or more cells belong to the carrier frequency. The layer is also called as frequency layer, carrier frequency layer etc. Each carrier frequency is addressed or indicated to the UE by an absolute channel number called as ARFCN e.g. UARFCN in UMTS, EARFCN in LTE etc.

The term bandwidth used herein is range of frequencies over which a node transmits to and/or receives signal from another node. The bandwidth is interchangeably referred to as operating bandwidth, channel bandwidth, system bandwidth, configured bandwidth, transmission bandwidth, cell bandwidth, cell transmission bandwidth, carrier bandwidth, etc. The bandwidth can be expressed in any one of the following: G1 MHz, G2 GHz, in terms of number of physical channels (e.g., G3 resource blocks, G4 subcarriers, etc). In one example the bandwidth can include guard band while in another example the bandwidth can exclude guard band. For example, system or channel bandwidth can include guard band while transmission bandwidth consists of bandwidth without guard band. For simplicity term bandwidth is used in the embodiments.

The term time resource used herein may correspond to any type of physical resource or radio resource expressed in terms of length of time. Examples of time resources are: symbol, time slot, subframe, radio frame, TTI, interleaving time, etc. The term TTI used herein may correspond to any time period (T0) over which a physical channel can be encoded and optionally interleaved for transmission. The physical channel is decoded by the receiver over the same time period (T0) over which it was encoded. The TTI may also interchangeably called as short TTI (sTTI), transmission time, time slot, sub-slot, mini-slot, mini-subframe, etc.

The term reference signals used herein may correspond to any type of physical signal pre-configured in the UE e.g. signal or associated sequence known to the UE. Examples of RS are CRS, DMRS, MBSFN RS, CSI-RS, PSS/SSS, NRS, NPSS, NSSS, PRS, PT-RS, signals in SSB (e.g. NR PSS, NR SSS, NR DMRS. etc).

The term energy estimation (or energy detection or energy measurement or energy determination) used herein may correspond to estimation of energy or power of signals at the UE over certain time and within certain part of frequency (e.g. bandwidth). The energy estimation is also called as power estimation, Power spectral density (PSD) estimation, strength estimation etc.

Embodiments of the present disclosure are applicable for a UE in any suitable state, including a UE in a low or in high activity state. Examples of low activity state are RRC idle state, idle mode etc. Examples of high activity state are RRC CONNECTED state, active mode, active state etc. The UE may be configured to operate in DRX or in non-DRX. If configured to operate in DRX, it may still operate according to non-DRX as long as it receives new transmissions from the network node.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1xRTT CDMA2000 1x Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CN Core Network
CP Cyclic Prefix
CPICH Common Pilot Channel
CPICH Ec/No CPICH Received energy per chip divided by the power density
in the band
CQI Channel Quality information
CRC Cyclic Redundancy Check
C-RNTI Cell RNTI
CSI Channel State Information
CSI-RS CSI Reference Signal
DCCH Dedicated Control Channel
DCI Downlink Control Information
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
ETWS Earthquake and Tsunami Warning System
E-UTRA Evolved UTRA
E-UTRAN Evolved UTRAN
FDD Frequency Division Duplex
GERAN GSM EDGE Radio Access Network
gNB Base station in NR
GNSS Global Navigation Satellite System
GSM Global System for Mobile communication
HARQ Hybrid Automatic Repeat Request
HF High Frequency/High Frequencies
HO Handover
HSPA High Speed Packet Access
HRPD High Rate Packet Data
IMSI International Mobile Subscriber Identity
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PI Paging Indicator
PO Paging Occasion
PRACH Physical Random Access Channel
P-RNTI Paging RNTI
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAR Random Access Response
RA-RNTI Random Access RNTI
RNA RAN Notification Area
RNTI Radio Network Temporary Identifier
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SAE System Architecture Evolution
SCH Synchronization Channel
SCell Secondary Cell
SDU Service Data Unit
SFN System Frame Number or Single Frequency Network
SGW Serving Gateway
SI System Information
SIB System Information Block
SNR Signal to Noise Ratio
SON Self Optimized Network
SS Synchronization Symbol
SSS Secondary Synchronization Signal
S-TMSI SAE-TMSI
TDD Time Division Duplex
TDOA Time Difference of Arrival
TMSI Temporary Mobile Subscriber Identity
TRP Transmission/Reception Point
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for lean carrier operation, the method comprising:
obtaining lean carrier assistance information (LCAI), the LCAI comprising the following sets of information for a carrier frequency:
reference signal (RS) muting pattern information, wherein the RS muting pattern information provides a RS muting pattern used in one or more cells on the carrier frequency; and
coverage area information, wherein the coverage area information indicates a coverage area where the RS muting is applied or is expected to be applied on one or more cells operating on the carrier frequency,
wherein obtaining the LCAI comprises at least one of obtaining pre-provisioned LCAI from memory and determining the LCAI using historical data; and
performing one or more radio operational tasks using the LCAI.

2. The method of claim 1, wherein the LCAI further comprises timing information, wherein the timing information indicates a time during which the RS muting is applied or is expected to be applied on one or more cells operating on the carrier frequency.

3. The method of claim 1, wherein the LCAI further comprises carrier frequency information, the carrier frequency information indicating one or more cells in which the RS muting pattern is applied or expected to be applied.

4. The method of claim 3, wherein the carrier frequency information is an absolute radio frequency channel number (ARFCN) of the carrier frequency.

5. The method of claim 1, wherein obtaining the LCAI comprises one or more of the following:
receiving the LCAI from a network node; and
receiving the LCAI from another wireless device.

6. The method of claim 1, wherein the LCAI is received from the network node via a master information block (MIB) or a system information block (SIB).

7. The method of claim 1, wherein the one or more radio operational tasks comprises one or more of:
performing an initial cell search;
performing a neighbor cell search;
performing time or frequency synchronization;
performing channel estimation;
optimizing power saving;
adapting the wireless device activity to the RS muting pattern;
storing the LCAI in a memory;
transmitting at least a portion of the LCAI to another wireless device; and
transmitting at least a portion of the LCAI to a network node.

8. The method of claim 1, wherein the coverage area information comprises one or more of a coverage area of one or more cells operating on the carrier frequency, a tracking area, a sector identifier, and a location information.

9. The method of claim 1, wherein the RS muting pattern information comprises at least one of an indication of a muted bandwidth and an indication of a muted time duration.

10. A wireless device operable to perform lean carrier operation, the wireless device comprising processing circuitry operable to:
 obtain lean carrier assistance information (LCAI), the LCAI comprising one or more of the following sets of information for a carrier frequency:
 reference signal (RS) muting pattern information, wherein the RS muting pattern information provides a RS muting pattern used in one or more cells on the carrier frequency; and
 coverage area information, wherein the coverage area information indicates a coverage area where the RS muting is applied or is expected to be applied on one or more cells operating on the carrier frequency,
 wherein obtaining the LCAI comprises at least one of obtaining pre-provisioned LCAI from memory and determining the LCAI using historical data; and
 perform one or more radio operational tasks using the LCAI.

11. The wireless device of claim 10, wherein the LCAI further comprises timing information, wherein the timing information indicates a time during which the RS muting is applied or is expected to be applied on one or more cells operating on the carrier frequency.

12. The wireless device of claim 10, wherein the LCAI further comprises carrier frequency information, the carrier frequency information indicating one or more cells in which the RS muting pattern is applied or expected to be applied.

13. The wireless device of claim 12, wherein the carrier frequency information is an absolute radio frequency channel number (ARFCN) of the carrier frequency.

14. The wireless device of claim 10, wherein the processing circuitry is operable to obtain the LCAI by one or more of the following:
 receiving the LCAI from a network node; and
 receiving the LCAI from another wireless device.

15. The wireless device of claim 10, wherein the LCAI is received from the network node via a master information block (MIB) or a system information block (SIB).

16. The wireless device of claim 10, wherein the one or more radio operational tasks comprises one or more of:
 performing an initial cell search;
 performing a neighbor cell search;
 performing time or frequency synchronization;
 performing channel estimation;
 optimizing power saving;
 adapting the wireless device activity to the RS muting pattern;
 storing the LCAI in a memory;
 transmitting at least a portion of the LCAI to another wireless device; and
 transmitting at least a portion of the LCAI to a network node.

17. The wireless device of claim 10, wherein the coverage area information comprises one or more of a coverage area of one or more cells operating on the carrier frequency, a tracking area, a sector identifier, and a location information.

18. The wireless device of claim 10, wherein the RS muting pattern information comprises at least one of an indication of a muted bandwidth and an indication of a muted time duration.

19. A method performed by a network node for lean carrier operation, the method comprising
 determining lean carrier assistance information (LCAI), the LCAI comprising the following sets of information for a carrier frequency:
 reference signal (RS) muting pattern information, wherein the RS muting pattern information provides a RS muting pattern used in one or more cells on the carrier frequency; and
 coverage area information, wherein the coverage area information indicates a coverage area where the RS muting is applied or is expected to be applied on one or more cells operating on the carrier frequency wherein determining the LCAI comprises at least one of obtaining pre-provisioned LCAI from memory and determining the LCAI using historical data; and
 transmitting the LCAI to a wireless device.

20. A network node operable to perform lean carrier operation, the network node comprising processing circuitry operable to:
 determine lean carrier assistance information (LCAI), the LCAI comprising the following sets of information for a carrier frequency:
 reference signal (RS) muting pattern information, wherein the RS muting pattern information provides a RS muting pattern used in one or more cells on the carrier frequency; and
 coverage area information, wherein the coverage area information indicates a coverage area where the RS muting is applied or is expected to be applied on one or more cells operating on the carrier frequency,
 wherein determining the LCAI comprises at least one of obtaining pre-provisioned LCAI from memory and determining the LCAI using historical data; and
 transmit the LCAI to a wireless device.

21. The network node of claim 20, wherein the LCAI further comprises timing information, wherein the timing information indicates a time during which the RS muting is applied or is expected to be applied on one or more cells operating on the carrier frequency.

22. The network node of claim 20, wherein the LCAI further comprises carrier frequency information, the carrier frequency information indicating one or more cells in which the RS muting pattern is applied or expected to be applied.

23. The network node of claim 22, wherein the carrier frequency information is an absolute radio frequency channel number (ARFCN) of the carrier frequency.

24. The network node of claim 20, wherein the processing circuitry is operable to transmit the LCAI by transmitting a master information block (MIB) or a system information block (SIB).

25. The network node of claim 20, wherein the coverage area information comprises one or more of a coverage area of one or more cells operating on the carrier frequency, a tracking area, a sector identifier, and a location information.

26. The network node of claim 20, wherein the RS muting pattern information comprises at least one of an indication of a muted bandwidth and an indication of a muted time duration.

* * * * *